United States Patent [19]
Olson

[11] 4,129,952
[45] Dec. 19, 1978

[54] WEAR STRIPS FOR EARTHMOVING BUCKETS

[75] Inventor: Harris S. Olson, Morton, Ill.

[73] Assignee: Caterpillar Tractor Co., Peoria, Ill.

[21] Appl. No.: 846,005

[22] Filed: Oct. 27, 1977

[51] Int. Cl.² .............................................. E02F 3/00
[52] U.S. Cl. ............................. 37/118 R; 37/141 R; 29/400 R
[58] Field of Search ............ 37/118 R, 118 A, 141 R, 37/DIG. 16, 141 T, ; 172/767; 29/400 R, 527.2, 400 M; 75/126 R, 126 P, 129, 130.5; 148/31, 31.5

[56] References Cited

U.S. PATENT DOCUMENTS

| | | | |
|---|---|---|---|
| 1,835,701 | 12/1931 | Edmunds | 37/141 T |
| 2,210,357 | 8/1940 | Beament | 148/31 |
| 3,180,440 | 4/1965 | Bridwell | 175/393 X |
| 3,185,228 | 5/1965 | Kelly, Jr. | 175/410 |
| 3,529,677 | 9/1970 | Stephenson | 172/767 |
| 3,912,338 | 10/1975 | Toews | 305/54 |
| 3,970,445 | 7/1976 | Gale et al. | 37/142 R X |
| 4,011,051 | 3/1977 | Helton et al. | 37/141 R X |

FOREIGN PATENT DOCUMENTS

| | | | |
|---|---|---|---|
| 2,335,588 | 7/1975 | Fed. Rep. of Germany | 37/118 |
| 1,222,056 | 2/1971 | United Kingdom | 37/118 R |

OTHER PUBLICATIONS

"Stringer Beads Increase Bucket Life", Excavating Engineer, Apr., 1945, p. 197.

*Primary Examiner*—E. H. Eickholt
*Attorney, Agent, or Firm*—Wegner, Stellman, McCord, Wiles & Wood

[57] ABSTRACT

A bucket with a bottom wrapper sheet and adjacent side plates has strips of material welded thereto at critical wear areas. The strips have a plurality of inserts of a hard wear-resistant material bonded into openings in said strips, which strips and inserts are heat treated prior to welding to the bucket. When excessive wear of the strips and inserts has taken place, the strips are removed and new strips with new inserts are welded to the wear areas of the bucket. A method of making and applying wear strips to a bucket is disclosed which includes the steps of forming and shaping the strips, drilling cavities into the shaped strips, bonding preformed inserts in said openings, heat treating the strips with the inserts bonded therein, and attaching the strips to said bucket.

15 Claims, 6 Drawing Figures

U.S. Patent Dec. 19, 1978 4,129,952
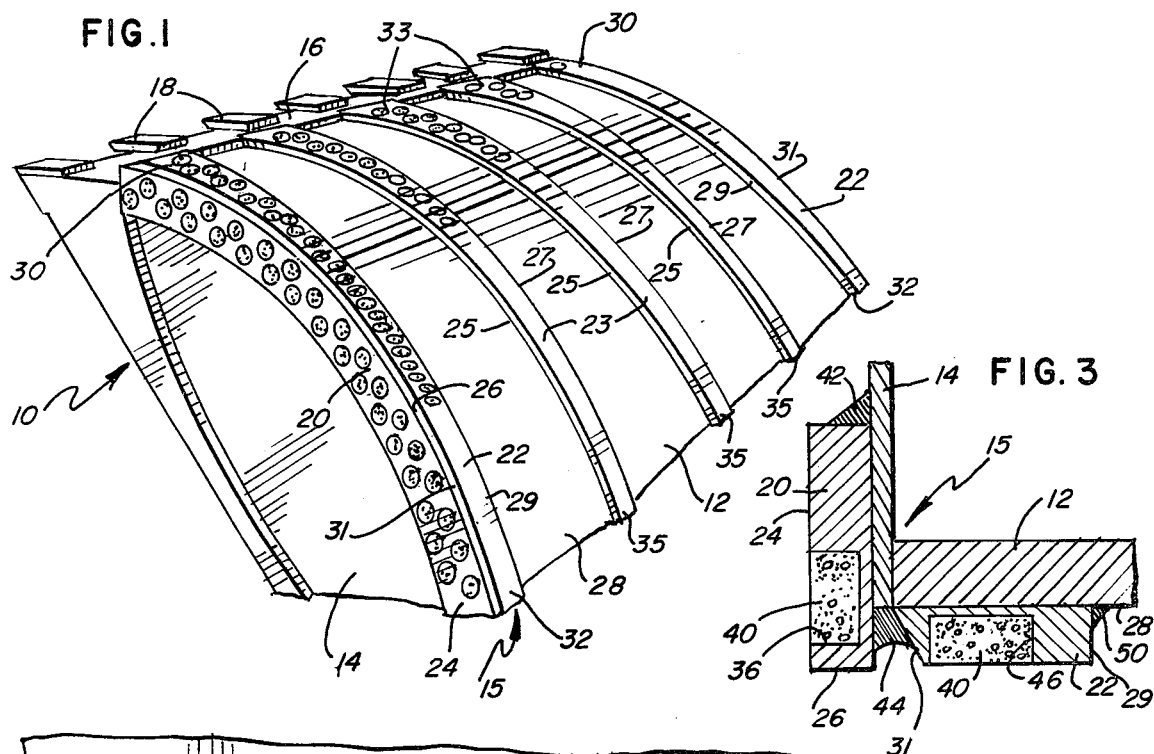
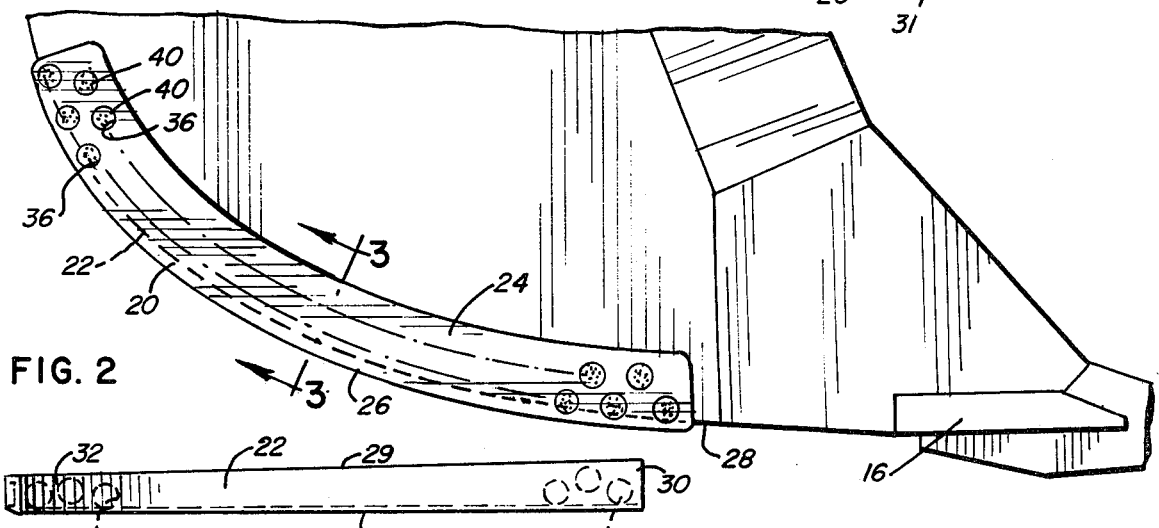
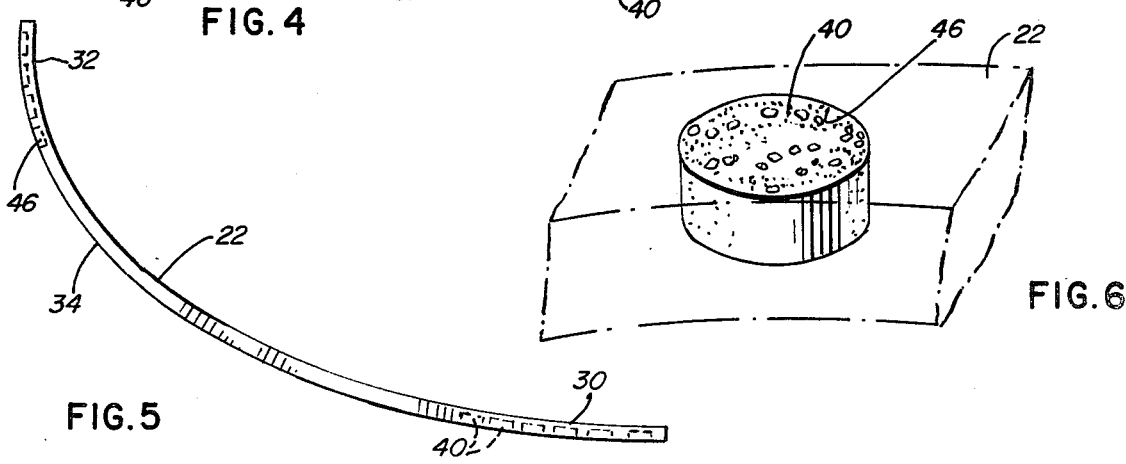

WEAR STRIPS FOR EARTHMOVING BUCKETS

BACKGROUND OF THE INVENTION

1. Field of the Invention

This invention relates to buckets of the type used on excavators, loaders, draglines, and the like, and, more particularly, to buckets having novel wear-resistant strips.

2. Description of the Prior Art

In the earthmoving field and, in particular, that portion of the field devoted to the use of buckets, the highly abrasive nature of the material being worked upon wears away the bottom wrapper strip and side plates of the bucket and, in particular, the corners of said bucket. One method of combating the wear on the corners and bottom of the bucket is to provide hardened wear strips or overlays having a hard facing. To increase the life of the strips, it has been proposed to increase the thickness of the plates or to increase the hard facing, but both of those solutions are undesirable since it increases the weight of the bucket which increases the stresses on the operating parts of the equipment.

One other solution was to form the excavating implement with grooves or sockets formed in the surface thereof. The grooves or sockets were then filled with a wear-resistant alloy, usually by the alloy being produced in the form of a rod, which alloy then was deposited by electric or oxy-acetylene welding directly into the grooves or sockets of the implement. In some cases, in addition to filling the socket or the grooves, the whole surface of the implement was coated with a coating of the material of the rod. The principal problem with this attempted solution was that the base material surrounding the grooves or sockets would errode away along with the wear-resistant material.

A second attempted solution was to embed particles of hard material in the surface of the implement. This could be done by depositing the hard particles in the base of the mold or positioning the particles in the base of the mold attached to a support strip. The base material of the casing is then poured in to set the hard particles in place. The principal problem with this solution was similar to that of the previous solution in that the material around the particles wore away with the particles so that once the depth of the particles was reached, there was no longer any substantial wear resistance.

In another solution, cylindrical inserts of a hard wear-resistance material are inserted directly into apertures in the face of an implement such that as the inserts wore away, the material surrounding the inserts, likewise, wore away.

Still another solution was to embed inserts of a material in the surfaces of pads on a tool such that as the inserts wore away, the surrounding materials also wore away.

In the four last-named solutions, the base material of the implement wore away with the inserts so that eventually the tool had to be replaced. Admittedly, the inserts prolonged the life of the tool or implement, but only temporarily.

SUMMARY OF THE INVENTION

The present invention is directed to overcoming one or more of the problems as set forth above.

According to the present invention, strips of a wear-resistant material are cut and formed to the desired shape. Sockets or apertures are formed in the shaped strip and preformed inserts of a hard wear-resistant material are inserted and are bonded into the sockets or apertures in the strips. The strips with the inserts in place are then heat treated whereupon the strips are attached to the dominant wear areas of the bucket. For instance, side strips are secured along the side corner edges of the bucket and bottom strips are secured, likewise, along the bottom corner edges of the bottom of the bucket. The side and bottom wear strips are welded to the sides and bottom of the bucket. Additional bottom wear strips may be secured by welding to various portions of the bottom of the bucket as desired.

After a considerable period of time, the inserts and wear strips will wear away whereupon the strips can be removed from the bucket and new wear strips containing new inserts of hard wear-resistant material are attached in their place. The base material of the bucket is, in this way, protected against wear and the life of the bucket is considerably extended.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a perspective view of a part of one corner of a bucket incorporating my invention;

FIG. 2 is a side view of one side of the bucket of FIG. 1;

FIG. 3 is a cross-sectional view taken along the lines 3—3 of FIG. 2;

FIG. 4 is a plan view of a bottom wear strip;

FIG. 5 is a side elevational view of the bottom wear strip of FIG. 4; and,

FIG. 6 is a perspective view of a wear insert prior to assembly with the wear strips.

DESCRIPTION OF THE PREFERRED EMBODIMENT

An earthmoving bucket 10 is illustrated in FIG. 1 with a portion broken away and is comprised of a bottom wrapper sheet 12 and a pair of side plates 14, only one being illustrated, attached to the wrapper sheet along the edge portions thereof. The bucket 10 has a forward cutting edge 16 which includes a plurality of forwardly projecting teeth or tips 18. The illustrated bucket has a curved bottom wrapper sheet 12 which produces a curved corner 15 at the junction with the side plates 14. However, it is to be understood that the bucket 10 could be any one of the known buckets, such as an excavator bucket, a loader bucket, a dragline bucket, or any of the special purpose buckets, such as buckets for slag, for rock, for demolition, and the like.

The present invention is directed toward elongating the life of the bucket 10 by providing novel side wear strips 20 to the side corners 15 of the bucket 10 and novel bottom corner wear strips 22 to the bottom corners 15 of the bucket 10. In some instances, spaced apart bottom intermediate wear strips 23 are provided on the bottom wrapper sheet 12 of the bucket 10 between the bottom corner wear strips 22.

As is shown in FIGS. 1 and 2, one side wear strip 20, having a curved configuration in the plane containing the broad wear face 24 of the strip, is attached to the side plate 14 with a convex edge 26 of the strip 20 extending in an overlapping relationship relative to the exposed surface 28 of the wrapper sheet 12. The bottom corner wear strips 22 are preferably provided with one longitudinally tapered edge 29 and one straight edge 31 which produce a wide end portion 30 and a narrow end portion 32. The bottom corner strips 22 have a curved shape in a plane perpendicular to the broad wear face 34 thereof to conform with the shape of the wrapper sheet 12. The bottom corner wear strips 22 are attached to the wrapper sheet 12 at the corners 15 with the wide end portions 30 of each strip 22 located at the cutting edge portion 16 of the bucket 10. The longitudinal straight edge 31 of each bottom wear strip 22 is located adjacent the side wear strip 20 and is spaced a short distance from the side wear strip 20 with the broad wear face 34 of the bottom wear strip 22 lying in a plane substantially coinciding with the plane of the convex edge 26 of the side wear strip 20.

In some applications, one or more bottom intermediate wear strips 23 are provided between the bottom corner wear strips 22. The intermediate wear strips 23 have both edges 25,27 longitudinally tapered which produce a wide end portion 33 and a narrow end portion 35. The intermediate wear strips 23 are secured to the wrapper sheet 12 with the wide end portion 33 located at the cutting edge portion 16 of the bucket 10.

The side wear strips 20 are cut from a sheet of heat treatable steel plate and have elongated parallel edges which conform in shape with the corner 15 formed by the junction between the bottom wrapper sheet 12 of the bucket 10 and the side plates 14. The side wear strips 20 have a plurality of bottom drilled holes 36 formed into one side of one strip 20 and in the opposite side of the other strip 20 to form left-hand and right-hand strips 20. The bottom drilled holes 36 are illustrated in FIG. 3 as penetrating a substantial distance into the strip 20 but do not pass completely through the strips 20. It is to be understood that, under certain circumstances, it may be desirable to drill the holes all the way through and it is to be understood that through holes are included within the scope of the present disclosure.

An insert 40 of hard wear-resistant material is intended to be nested in each bottom drilled hole 36 in the side wear strips 20 with the inserts 40 being bonded or brazed into said holes 36. The hard wear-resistant inserts 40 are made by casting a composite composed of hard particles in a matrix, which casting takes place in a ceramic mold. The composition of the composite and the method of making and molding same is contemplated to be any one of the well known wear-resistant alloys presently available. It is preferred that the wear-resistant alloys for the inserts be made as described in U.S. Pat. Nos. 3,970,445 and 4,011,051. A typical preferred alloy consists of spheroid particles that have a composition of about 58% chromium, 9% boron with the remainder iron. The composition is surrounded by a matrix alloy of iron and boron in the amounts of about 3.8% boron and the remainder of the matrix being iron. The spheroidal particles are captured in the matrix and should be sufficiently closely spaced to block wear paths when abrasive wear occurs in the composite alloy material.

The side wear strips 20 have the inserts 40 nested in the holes 36 in a pattern such that the direction of wear of the direction of abrasion on the strip will most likely pass across one or more inserts 40. As illustrated, the holes 36 and inserts 40 are formed in a zigzag or diagonal pattern which, when translated to a strip with a curved shape, provides a wear surface that, at the area where the most wear may take place, namely at that portion of the strip nearest to the front cutting edge 16 of the bucket 10, several inserts 40 will line up so that no abrasive particle can cut a groove across the entire length or width of the wear strip. The side wear strips 20 with the inserts 40 embedded therein are heat treated and are then welded to the corners of the two sides 14 of the bucket. The convex edge 26 of the strips 20 projects beyond the plane of the bottom wrapper sheet 12 and is welded at 42 to the side plate 14 of the bucket 10 and, the underside of the strip 20 is, likewise, welded at 44 to the corner 15 of the bucket.

The bottom corner wear strips 22 are cut from a sheet of heat treatable steel plate with the taper on the one edge 29 extending from the wide end portion 30 to the narrow end portion 32 thereof. The straight edge 31 is chamfered in the direction of the thickness of the strip starting from the wear face 34. Likewise, bottom intermediate wear strips 23 are cut from a sheet of heat treatable steel plate with the taper on both edges 25,27 to form the wide end portion 33 and the narrow end portion 35. The corner strips 22 and intermediate strips 23 are then shaped or bent into a curved form in a plane perpendicular to the wear face 34 of the strips so as to conform the strips to the shape of the bottom wrapper sheet 12 of the bucket 10 with the wide end portion 30 at the front of the bucket 10. The corner strips 22 are shaped so that the straight and chamfered edge lies along the edge of the wrapper sheet 12 on either the left or the right side thereof. The convex side or wear face 34 of each bottom corner wear strip 22 and each intermediate wear strip 23 has a plurality of bottom drilled holes 46 drilled therein which, on the wide end portions 30 or 33 of the strip, are staggered in a zigzag pattern and, as the narrow end portions 32 or 35 of the strips are approached, the holes 46 become substantially aligned with each other. A plurality of hard wear-resistant inserts 40 are made of the same material and of the same size as that described with respect to the inserts 40 in the side strips 20. The inserts 40 are positioned in each hole 46 in the strips 22 and strips 23 and are bonded or brazed in said holes. The bottom corner wear strips 22 and bottom intermediate wear strips 23 with the inserts 40 bonded or brazed therein are then heat treated and are ready for assembly with the bucket.

The wide end portion 30 of one bottom corner wear strip 22 is placed near the cutting edge 16 of the bucket 10 with the straight edge 31 of the strip 22 positioned adjacent the overhanging convex edge 26 of the side strip 20. The bottom corner strips 22 will be close to the corners 15 of the bucket 10 along the edge of the bottom wrapper sheet 12. The bottom corner strips 22 with the chamfer therein are then welded in place at 44 along the edges thereof with the weld 44 on the side of the bottom corner strip 22 adjacent the side strip 20 being a common weld holding both the side strip 20 and the bottom corner strip 22. The chamfered edge 31 permits better access and, therefore, a better weld at 44.

As shown in FIG. 3, the flat or wear face 34 of the bottom corner strip 22 lies in a plane substantially coincident with the plane of the convex edge 26 of the side strip 20. In an optional manner, additional bottom intermediate wear strips 23 containing hard wear-resistant inserts 40 may be positioned and welded on the bottom sheet 12 of the bucket 10 preferably in equally spaced apart relationship with the longitudinal axes of the intermediate strips 23 being substantially parallel to each other and to the longitudinal axis of the bucket. The bottom intermediate wear strips 23 are tapered to save weight in that the maximum wear takes place at the front of the bucket so that the portions 33 of the wear strips 23 near the cutting edge 16 of the bucket are made wider and have an increased number of inserts 40 therein.

The bucket 10 will be used as contemplated with the hard wear-resistant inserts 40 in the wear strips 20, 22 and 23 substantially prolonging the useful life of the bucket. When the wear strips 20, 22 and 23 with the inserts 40 have substantially worn away, the worn strips are removed and new heat-treated wear-resistant strips 20, 22 and 23 with inserts 40 are welded to the bucket in the place of the removed strips. In this way, the bottom wrapper sheet 12 and the side plates 14 receive very little wear, which wear is taken by the exposed side wear strips 20, the bottom corner wear strips 22 and the bottom intermediate wear strips 23.

The wear strips 20, 22 and 23 of the side and bottom are relatively thin with the inserts 40 formed therein so that the total weight of the wear strips 20, 22 and 23 is approximately the same as previous wear strips that did not contain the inserts. However, the useful life of the wear strips 20, 22 and 23 with the inserts 40 extends far beyond the useful life of prior wear strips.

A novel method of making and applying wear strips 20, 22 and 23 containing inserts 40 to a moving bucket is disclosed wherein the side strips 20 are cut from plates of heat treatable steel, wherein shape of the side strips 20 conforms to the shape of the bucket 10 at the corners 15 of the bucket. Likewise, the bottom corner strips 22 and bottom intermediate strips 23 will be cut from heat treatable steel, which bottom strips 22,23 will be formed to the shape of the bucket bottom wrapper sheet 12. Bottom drilled holes 36,46 are formed in the shaped side strips 20 and the shaped bottom strips 22 and 23, respectively. A wear-resistant insert 40 formed to the shape of the bottom drilled holes 36,46 is positioned in each hole and is bonded or brazed in place. The side strips 20 and bottom strips 22,23 with the inserts 40 bonded or brazed therein are then heat treated whereupon the side strips 20 and the bottom corner strips 22 are welded to the corners 15 of the bucket 10 with bottom intermediate strips 23 being welded between the corners 15 of the bucket 10 to provide an improved longer wearing bucket.

The embodiment of the invention in which an exclusive property or privilege is claimed is defined as follows:

1. A wear-resistant bucket having a bottom wrapper sheet joined with a pair of spaced apart side plates, a side strip carried by each side plate and mounted near said bottom wrapper sheet, at least two bottom strips carried by said bottom wrapper sheet, said bottom strips being mounted near said side plates, and a plurality of wear-resistant inserts bonded into said side strips and said bottom strips.

2. A wear-resistant bucket as claimed in claim 1 wherein said bottom strips are tapered in width with the wider part being located close to the cutting edge of said bucket.

3. A wear-resistant bucket as claimed in claim 1 wherein said inserts are circular in shape.

4. A wear-resistant bucket as claimed in claim 1 wherein said strips have bottomed openings therein, and said inserts are nested in said bottomed openings and are bonded to the walls of said openings.

5. A wear-resistant bucket as claimed in claim 1 wherein said side strips overlap said bottom wrapper sheet.

6. A wear-resistant bucket as claimed in claim 1 wherein additional bottom strips are carried by the bottom wrapper sheet between said at least two bottom strips.

7. A wear-resistant bucket as claimed in claim 1 wherein said two bottom strips are bottom corner strips and at least one additional bottom strip is a bottom intermediate strip carried by said bottom wrapper sheet.

8. A wear-resistant bucket as claimed in claim 1 wherein said inserts are comprised of spheroidal particles of about 58% chromium, 9% boron and the remainder iron and said particles being surrounded by a matrix alloy of about 3.8% boron with the remainder iron.

9. A wear-resistant bucket as claimed in claim 1 wherein said strips are welded to said bucket.

10. A wear-resistant bucket as claimed in claim 1 wherein said strips with said inserts bonded therein are heat treated prior to being welded to said bucket.

11. A wear-resistant bucket having a curved bottom wrapper sheet joined at corners with a pair of spaced apart side plates, a side wear-resistant strip carried by each side plate and overlapping said curved bottom wrapper sheet, at least two bottom wear-resistant strips carried by said curved bottom wrapper sheet, said bottom strips being mounted near said corners, and a plurality of wear-resistant inserts bonded into said side strips and said bottom strips.

12. A method of making a bucket having a high wear resistance comprising cutting a pair of side strips from a sheet of heat treatable steel with said strips having edges shaped to conform with the shape of the corner between the bottom wrapper sheet and the side plates of the bucket, drilling bottomed holes in opposite sides of said side plates, cutting at least two bottom strips from a sheet of heat treatable steel, shaping said bottom strips to conform with the contour of said bottom wrapper sheet, drilling bottomed holes in the convex surface of said bottom strips, bonding preformed wear-resistant inserts in said bottomed holes in said side strips and said bottom strips, heat treating said side strips and bottom strips, and welding said side strips to the side plates and the bottom strips to the bottom wrapper sheet, one of said side strips and one of said bottom strips being in overlapping relationship at each corner of said bucket.

13. A method as claimed in claim 12 wherein a plurality of bottom strips are cut and formed with two of said bottom strips being bottom corner strips and at least one additional bottom strip being a bottom intermediate strip mounted between said bottom corner strips on the bottom wrapper sheet.

14. A method as claimed in claim 12 wherein a convex edge of each side strip extends beyond the plane of the wrapper sheet and aligns with a plane containing the contact surface of said bottom strips.

15. A wear-resistant bucket having a bottom wrapper sheet joined with a pair of spaced apart side plates, a side strip carried by each side plate and overlapping said bottom wrapper sheet, at least two bottom strips carried by said bottom wrapper sheet, said bottom strips being mounted near said side plates, and a plurality of wear-resistant inserts bonded into said side strips and said bottom strips.

* * * * *